Patented Aug. 31, 1948

2,448,265

UNITED STATES PATENT OFFICE 2,448,265

PROTECTION OF CROPS BY SOIL FUMIGATION

John Franklin Kagy and Robert R. McPherson, Long Beach, Calif., assignors to The Dow Chemical Company, Midland, Mich., a corporation of Delaware No Drawing. Application December 22, 1945, Serial No. 637,105

8 Claims. (Cl. 47—58)

This invention relates to the protection of crops and is particularly concerned with a method for protecting the underground parts of plants from attack by soil inhabiting invertebrates.

Wherever plants and particularly field crops are grown, the problem of soil treatment has been of interest for as long as the existence of undesirable and harmful animal organisms in the soil has been recognized. The damage to and destruction of the underground portions of plants by such pests as nematodes, wireworms, maggots, grubs, and the like, is a major problem to all agriculturists. In certain areas, the building up of nematode and wireworm populations has substantially curtailed the cultivation of many food crops. Elsewhere it has been necessary to eliminate or shift entire industries because the plant products upon which they depend for operation can no longer be grown in prevailing organism-infested soils.

In an effort to combat the spread of soil infections, plant quarantines have been established from time to time. These have been largely unsuccessful and generally have not prevented the spread of the organisms against which they are directed.

In greenhouse operations, to avoid the necessity of frequent soil changing, it has been common practice to treat soil by heating, as with steam. Also, the chemical treatment of soil to control nematodes, wireworms, and the like, has been the subject of extensive investigation in both greenhouse and field operations. Aqueous solutions of poisons have been used to saturate infected and infested soil. Various fumigation practices have been attempted. Deep cultivation, flooding, planting of trap and bait crops, and the like, have all been tried. Of these remedies, most are so expensive as to be economically unattractive in large scale operation. Others result in the poisoning of the soil so as to make it unfit for planting over long periods of time. Still others give spotty or incomplete control.

Considerable interest has developed in the treatment of soil with synthetic organic compounds. For the most part the latter are liquids at ordinary temperatures and of such volatility that the actual control of organisms is accomplished by fumigation. While such operation has, in certain instances, resulted in the reduction of nematode and wireworm populations, serious disadvantages have included the extended periods required for the exertion of the toxic action and the poisoning of the soil whereby the latter may not successfully be planted for some time after treatment.

The slow action of certain of these fumigants makes desirable the blanketing of the soil with paper or tarpaulins, or the maintaining of a high moisture content in the top soil to prevent the rapid dissipation of the toxicant by vaporization. The temporary poisoning of the soil results in such planting delays as are undesirable, particularly where a relatively short growing season prevails or when it is desired to take advantage of seasonal precipitation.

Among the objects of the present invention is the provision of an improved method for protecting crops and particularly the underground portions of plants from attack by soil-inhabiting invertebrates. A further object is to provide such a method which will include the treatment of soil and still permit the immediate utilization of the treated soil for crop purposes. An additional object is to provide a soil treatment method which will employ a material adapted to be applied without particular hazard to man and animals, and which will be more rapid in its action than many of those previously employed. Other objects will become apparent from the following specification and claims.

According to the present invention, the underground parts of crops are protected against attack by soil-inhabiting invertebrates by treating the soil with ethylene bromide and thereafter planting the treated soil. The ethylene bromide, when distributed through the soil, accomplishes the rapid control of such organisms as wireworms, nematodes, grubs, maggots, and the like. A further advantage is that the treatment does not poison the soil and planting can be carried out immediately following the treating step. This fortunate combination of circumstances obviates the practice of blanketing the soil surface after treatment as is required with many fumigant materials, and avoids the undesirable waiting period between treatment and seeding which previously has been considered essential.

The amounts of ethylene bromide required to give satisfactory control of soil-inhabiting invertebrates are much smaller than with many other fumigant materials, which results in an economy of operation permitting the utilization of the method on a scale not previously considered feasible. A further advantage of the method is found in the relatively low toxicity of the ethylene bromide to humans, and its low flammability whereby the actual application is not accompanied by the hazards characterizing many treating methods heretofore known.

In carrying out the invention, the ethylene bromide, a solution thereof in an inert liquid carrier, an emulsion thereof in water, or a dispersion of ethylene bromide in and on a finely divided carrier, is distributed through the soil, and the soil thereafter seeded or otherwise employed for crop purposes. The step of immediate seeding is advantageous since it permits the plant to become well established before possible reinfestation of the treated soil. Also, in tropical or subtropical areas, the growing of a multiplicity of crops per year is not interfered with by reason of enforced fallowing to permit the dissipation or disintegration of the treating material. The application of the ethylene bromide is preferably carried out at the completion of the plowing, disking, or other operation calculated to condition the soil for planting, but not necessarily. As will subsequently be shown, the application may accompany and be made an integral part of most of the conventional soil working practices.

A preferred mode of operation comprises applying the ethylene bromide dissolved in a liquid carrier or extender. Any suitable liquid hydrocarbon may be employed as a carrier, although a material boiling between 50° and 200° C. is preferable. Such hydrocarbon product is conveniently obtained by the fractionation of petroleum oil, but may be synthetic in nature.

Representative chloro-hydrocarbons which may be employed as carriers include normalpropyl chloride, secondary-butyl chloride, propylene chloride, ethylene chloride, and the like. Similarly, other organic solvents such as the ethers, or esters may be employed provided only that such carrier not react with the ethylene bromide or interfere with the subsequent utilization of the soil for agricultural purposes.

The proportions in which the ethylene bromide and liquid carrier are combined vary considerably depending upon the particular organism to be controlled. In general, 2.5 per cent or higher by volume of ethyl bromide in the carrier gives good results. The preferred range of proportion is from 10 to 50 per cent by volume of ethylene bromide. For the control of wireworms, an ethylene bromide concentration of 5 to 10 per cent or higher is desirable. For control of nematodes a concentration of at least 10 per cent is preferred. Mixtures of the latter percentage composition are suitable for the control of grubs.

From 10 to 120 pounds of ethylene bromide is generally applied per acre of soil, the exact amount depending upon the organism concerned and the nature of the soil. A satisfactory control of most organisms is obtained when a dosage of from 25 to 75 pounds of ethylene bromide per acre is employed.

Any suitable method may be employed for distributing the ethylene bromide through the soil. The straight ethylene bromide, a solution in an extender, or a liquid dispersion, may be introduced by either spot injection or by conventional drilling technique. In the injection operation, a syringe-type applicator or other suitable device is employed to deliver a measured quantity of the fumigant material into the soil at spaced intervals. In drilling operations, a convenient apparatus consists of an applicator embodying a plurality of steel blades or shanks, 12 to 18 inches apart and to which are attached tubes connecting with a reservoir containing the fumigant. The latter is delivered through the tube or tubes under pressure at a point behind each blade and below the surface of the soil. The assemblage may be constructed as an integral portion of a tractor, or mounted on a carriage and drawn through the field in any convenient fashion to accomplish the distribution of the fumigant.

It has been ascertained that the ethylene bromide permeates the soil for a distance of 6 to 9 inches from the point of application depending upon the temperature, moisture content, and physical nature of the soil. In any drilling or injection application, it is desirable that the fumigant be deposited at from 2 to 7 inches below the soil surface, and that the distance from one point of deposit to the next be not greatly in excess of 12 to 18 inches. In either injection or drilling operations, it is preferred that the soil disturbed by the introduction of the fumigant be replaced and packed. Following injection, it is generally sufficient for the operator to press the soil back into place. In drilling operations, a broad wheel, drag, or other device may be rigged behind each fumigant delivery tube to press down the soil and cover the freshly deposited fumigant.

Emulsion compositions in which the ethylene bromide is dispersed in water may be applied substantially as described above for the unmodified toxicant or solutions in organic solvent, and the foregoing comments with respect to preferred proportions of ethylene bromide and dosage are generally applicable. In addition, such emulsions may be introduced into irrigation water or applied directly to the surface of the soil.

The ethylene bromide may also be dispersed in and on a solid carrier, and the latter disked or plowed into or under the surface of the field or strewn into the furrow behind a conventional plowshare and thereafter covered by the succeeding furrow slice. The amount of such finely-divided composition employed in terms of volume or weight is immaterial provided that the required amounts of ethylene bromide per acre be supplied by the composition.

The preferred soil temperature at time of treatment is 55° F. or higher since it has been found that the effectiveness of the ethylene bromide against certain soil organisms, e. g. nematodes, is materially reduced at lower soil temperatures. However, where other organisms are concerned, e. g. wireworms, efficient control can be obtained at temperatures as low as 40° F., or lower.

In the preparation of aqueous emulsions of ethylene bromide, any suitable dispersing and emulsifying agent may be employed. Partially neutralized sulfonated animal, vegetable, and fish oils, glyceryl oleates, and naphthenate type emulsifiers are operable. Where a finely divided solid fumigant is desired, various materials such as carbon, vermiculite, sawdust, volcanic ash, diatomaceous earth, etc., may be employed as carriers for the product.

Certain of the following examples are concerned with the sugar beet wireworm, *Limonius californicus* Mann, which is the larva of a click beetle. This insect is widely distributed throughout the cultivated regions of the United States. It attacks many field and truck crops.

Others of the examples describe the control of the root-knot nematode, *Heterodera marioni* (Cornu). This organism has long been recognized as a serious agricultural pest of general distribution. In the United States, important areas of infestation occur in the southern and southwestern regions. This nematode is also prevalent in most greenhouses, and, along with other nematodes such as the sugar beet nematode and the citrus nematode, are limiting factors in crop production.

The following examples illustrate the invention but are not to be construed as limiting:

Example 1

Seed beds infested with wireworms were treated at the rate of 20 gallons per acre with a 10 percent by volume solution of ethylene bromide in a petroleum hydrocarbon fraction boiling at 71°–124° C. The distribution was accomplished by injecting the solution into the soil on 6-inch centers and at a level 4 inches below the surface of the soil.

Within one hour of treating, the plots were planted with a variety of seeds, check plots being provided for each species. 17 days after planting, the plots were examined to determine both the kill of wireworms attributable to the treatment and the percentage germination of the various plantings. The following table sets forth the results obtained, the percentage germination in each instance being based on the result obtained in the corresponding control plot as 100 percent.

| Species of Seed | Per Cent Germination as Compared to Control as 100% | Per Cent Kill of Wireworms |
| --- | --- | --- |
| Lima bean | 93.75 | 94 |
| Bush pea | 114.81 | 98 |
| Spanish onion | 98.78 | 98 |
| Table beet | 94.71 | 98 |
| Sugar beet | 132.56 | 94 |
| Banana squash | 109.76 | 92 |
| Carrot | 109.24 | 100 |
| Spinach | 90.53 | 100 |
| Corn | 104.88 | 100 |
| Control | | 29.11 |

Example 2

A fumigant composition was prepared by dissolving 20 gallons of ethylene bromide in 80 gallons of ethylene chloride. This composition was applied to portions of a field of sandy loam with a tractor-drawn rig consisting of two steel blades or shanks 18 inches apart through which the fumigant was delivered from a reservoir and under pressure at a point 5 to 7 inches below the surface of the soil. The fumigant mixture was applied at 40 gallons per acre.

One month old Ponderosa tomato plants were transplanted from sterile soil to one section of the treated plot at intervals of one week, 2 weeks, and 4 weeks after application of the fumigant. The plants were spaced at 4-foot intervals in rows 6 feet apart. At the end of the growing season, the roots of representative plants in an 18-inch radius and depth from the crown of the main stem were removed from the soil, washed, and examined. It was found that the plants transplanted at intervals of 1, 2, and 4 weeks had grown luxuriantly and developed roots which were completely free of nematode infestation.

In a control determination on an untreated portion of the field, tomato transplants showed heavy nematode infestation as evidenced by gall formations on the roots. In various sections of the immediate area surrounding the treated plot, plantings of tomatoes were found to be 100 percent gall infested.

Other portions of the treated plot were sowed with lima beans. At time of harvesting, only 2.8 percent of the bean plants were found to have galls on their roots as evidence of nematode infestation. In untreated plots adjacent thereto, as high as 100 percent infestation of beans was observed.

Carrots also were sown in both the treated and untreated plots. At time of harvesting, those grown in the area injected with the fumigant mixture were 100 percent clean and free of nematode attack. In adjacent areas, up to 75 percent of the carrots showed gall formation, split roots, and unsightly nodules attributable to nematode attack. A high percentage of the latter crop was so damaged as to be unmarketable.

A comparison was made in which 40 gallons of carbon bisulfide was used as a soil fumigant and the several crops thereafter planted. At the end of the growing season, the tomatoes were found to be 87.5 percent gall infested. The beans were 100 percent and the carrots 75 percent gall infested.

Example 3

Field applications were carried out with 5% by volume solutions of ethylene bromide in three petroleum hydrocarbon oils, oil A boiling at 71°–124° C., oil B boiling at 91°–146° C., and oil C boiling at 116°–190° C. for the control of nematodes. Observations were made to determine the maximum lateral distance from the point of injection over which the compositions would give control of the organism.

40-mesh bronze screen cages, tubular in shape, 6 inches long and 1.75 inches in diameter, were filled with nematode-infested soil. The filled tubes were buried 6 inches deep at points midway between parallel rows of a series of soil treatments consisting of injections of 5-milliliter portions of fumigant mixture at 3-inch intervals 6 inches below the surface of the ground. In various plots, the rows of injections were spaced 12 inches and 18 inches apart to check on penetration at 6-inch and 9-inch distances, respectively. The test cages were allowed to remain buried in the soil for one week following application of the fumigant mixtures. The cages were then removed, emptied into open jars, and allowed to stand for one week. At the end of this time, one tomato plant was transplanted to each jar, allowed to grow for 4 weeks and thereafter removed and examined to determine the degree of gall formation present on the roots. The following table sets forth the results obtained in this operation:

| 5% Ethylene Bromide in— | Distance from Cage to Injection Row | Degree of Nematode Attack on Roots |
| --- | --- | --- |
| | Inches | |
| Oil A | 6 | Trace. |
| | 9 | Light. |
| Oil B | 6 | Light. |
| | 9 | Medium. |
| Oil C | 6 | Trace. |
| | 9 | Light. |
| Control | | Heavy. |

At the 12-inch spacing between injection rows, the approximate dosage applied was 90 gallons per acre. At the 18-inch spacing, the dosage was approximately 58 gallons per acre.

Example 4

A series of operations were carried out in which mixtures of ethylene bromide in Oil A, as described in Example 3, were applied to test plots for control of root-knot nematode at soil temperatures ranging up to 70° F. The treating solutions varied from 5 to 15 per cent by volume in ethylene bromide content. Applications were made in which the fumigant mixture was injected into the soil at dosages of from 2.25 to 6.75 milliliters per cubic foot.

At soil temperatures of 55° F. and lower, it was found that the effectiveness of the compositions was materially reduced. This was evidenced by the fact that heavy gall infestation occurred in and on the roots of all tomatoes transplanted into soil fumigated at these temperatures and that 61 per cent of the transplanted tomatoes were killed by nematode attack or other causes. The amounts of the fumigant mixture employed and the concentration of ethylene bromide apparently were immaterial and all test plots indicated the treatments to be ineffective at low temperatures.

At temperatures above 55° F., the fumigation operations were successful with all concentrations and amounts of material. The degree of infestation of the root systems by gall formation was materially reduced in each instance. Also, the mortality of the transplanted tomatoes was reduced to less than 9 per cent.

Example 5

A series of determinations were carried out for the control of the root-knot nematode in which ethylene bromide was applied in 10 per cent by volume solutions in several liquid carriers. The fumigant mixtures were applied by means of an applicator consisting of a row of seven steel blades or shanks spaced twelve inches apart on a rigid bar-mounting and adapted to be drawn through the soil at adjustable depths. Behind each shank and attached thereto was a tube through which predetermined amounts of liquid fumigant were continuously delivered from a central tank and into the soil cut made by the shank. A soil packing wheel was positioned behind each shank to replace the soil displaced by the passage of the shank. The assemblage of shanks, delivery tubes, tank, and covering wheels was mounted on a carriage and drawn through the field to accomplish the fumigant distribution. The speed of the machine was so regulated and the metering and dispensing attachments so adjusted that the liquid compositions were distributed quantitatively and uniformly throughout the areas under treatment. The several compositions were applied in four-tenth acre plots, six inches below the soil surface, and at a rate of 40 gallons per acre. The treated and check plots were then planted to lima beans.

128 days after planting, 50 plants were selected at random from each plot, each plant dug to a depth of 10 inches, washed, and the roots examined for gall formation attributable to nematode attack. In judging the presence or absence of nematode injury, an arbitrary system of "gall numbers" was established. According to this system a rating of "0" indicated no gall formation. A rating of "1" indicated a light infestation with only a few galls. A rating of "2" indicated appreciable gall formation but some unaffected roots. A rating of "3" indicated heavy gall formation on all roots.

From the examination it was found that bean plants from plots treated with the 10 percent by volume solutions of ethylene bromide in the petroleum hydrocarbon oils described in Example 3 as oil A, oil B and oil C, and in propylene chloride had gall ratings of zero. The plants from the check plots ranged in gall number from 1 through 3 with an average rating of over 2.

Example 6

A series of compositions containing from 2.5 per cent to 15 per cent by volume of ethylene bromide in Oil A, as described in Example 3, were applied to soil for the control of root-knot nematode substantially as described in Example 5. The treated and control plots were then planted to sweet potatoes. The following table sets forth the treatments and amounts of materials employed, the results of examination at harvest time of the roots of plants selected at random and rated by gall numbers, and the comparative yields of marketable potatoes in terms of pounds per acre:

| Vol. Per Cent of Ethylene Bromide | Gals. Soln per Acre | Gals. Ethylene Bromide per Acre | Number Plants Examined | Number of Plants Having Gall Number Ratings of— | | | | Mean Gall Number Rating | Marketable Potatoes, Lb./Acre |
|---|---|---|---|---|---|---|---|---|---|
| | | | | 0 | 1 | 2 | 3 | | |
| 2.5 | 38.3 | 0.93 | 340 | 37 | 77 | 112 | 114 | 1.89 | 5,550 |
| 5.0 | 38.9 | 1.94 | 431 | 118 | 167 | 97 | 49 | 1.18 | 9,180 |
| 10.0 | 36.7 | 3.67 | 466 | 198 | 145 | 94 | 29 | 0.94 | 13,850 |
| 15.0 | 42.3 | 6.34 | 158 | 126 | 23 | 8 | 1 | 0.26 | 14,400 |
| Control | | | 478 | 3 | 29 | 98 | 348 | 2.65 | 816 |

In a similar operation, compositions similar to those above described were applied in the treatment of fields subsequently planted to sugar beets. The yield of beets from the several plots harvested was 4–15 to 1 in favor of the treated plots in comparison with the controls.

Example 7

The operation described in the preceding example served as basis for the determination of the effectiveness of the several treatments in wireworm control. Here the comparative efficiency of the several dosages was determined by examination of the sweet potatoes at time of harvest for injury due to entry of the potatoes by wireworms. The following table sets forth the results obtained:

| Volume Per Cent of Ethylene Bromide | Gals. of Solution Per Acre | Gals Ethylene Bromide Per Acre | Total Number Potatoes Examined | Potatoes Showing— | | | | | | Per Cent Total Crop Damaged |
|---|---|---|---|---|---|---|---|---|---|---|
| | | | | No Injury | | Light Inj. | | Heavy Inj. | | |
| | | | | No. | Per Cent | No. | Per Cent | No. | Per Cent | |
| 2.5 | 38.3 | 0.93 | 1,371 | 1,101 | 80.3 | 227 | 16.6 | 43 | 3.1 | 19.7 |
| 5.0 | 38.9 | 1.94 | 2,068 | 1,928 | 93.1 | 137 | 6.7 | 3 | 0.2 | 6.9 |
| 10.0 | 36.7 | 3.67 | 2,505 | 2,293 | 91.5 | 207 | 8.3 | 5 | 0.2 | 8.5 |
| 15.0 | 42.3 | 6.34 | 899 | 880 | 97.9 | 16 | 1.8 | 3 | 0.3 | 2.1 |
| Control | | | 1,376 | 163 | 11.9 | 357 | 25.9 | 856 | 62.2 | 88.1 |

Example 8

A field treatment was carried out in which ethylene bromide without carrier was injected 6 inches below the soil level and at 12-inch intervals in rows spaced 12 inches apart. The amounts of ethylene bromide employed per injection varied with the desired dosage per acre.

Immediately after treatment, specially constructed screen cages, 6 inches long and 1.75 inches in diameter were inserted in holes bored in the soil midway between the rows of injections. Earth was packed in each cage along with 15 wireworms and a few moistened wheat seeds to provide food for the latter. The tops of the cages were 3 inches beneath the soil surface.

Part of the test cages were removed from the soil after 7 days and the others after 15 days. The soil was removed from each cage and separately sifted. The recovered worms were incubated for a period of 3 days to determine any delayed effect of the fumigant. The following table sets forth the results obtained as regards kill of the wireworms:

| Gals of Ethylene Bromide Per Acre | Per Cent Worms Dead After 7 Days | Per Cent Worms Dead After 15 Days |
| --- | --- | --- |
| 2.0 | 94.5 | 100 |
| 1.0 | 70.0 | 100 |
| 0.5 | 47.8 | 95.5 |
| Control | 10.0 | 17.3 |

Example 9

Determinations were carried out to ascertain the lateral distance from point of injection at which solutions of ethylene bromide in a number of solvents were effective against wireworms. In this operation, 5-milliliter portions of the fumigant mixtures were injected at a level 6 inches below the surface of the soil. At radial distances of from 3 to 9 inches from the several points of injection specially constructed screen cages, 6 inches long and 1.75 inches in diameter, were inserted in holes bored with a 2-inch auger. Earth was packed in each cage along with 10 wireworms and a few moistened wheat seeds to provide food for the latter. The tops of the cages were 3 inches beneath the soil surface.

The fumigant mixture employed consisted of 10 per cent ethylene bromide in a petroleum hydrocarbon fraction having a boiling range of 100°–110° C. This mixture was injected into the soil as described, and the test cages allowed to remain in the soil for one week. The cages were then removed, sifted, and the worms incubated for a period of 3 days to determine any delayed effect of the fumigant. 100 per cent mortalities were obtained against the worms exposed at distances from 3 to 6 inches, inclusive, of the point of injection. At 9 inches from the point of injection a kill of but 20 per cent was obtained.

Example 10

The series of operations described in Example 5 were repeated to determine the effectiveness of the several compositions against wireworms. In this determination, 10 per cent by volume solutions of ethylene bromide in propylene chloride and Oil A, Oil B and Oil C, as described in Example 3, were employed at 40 gallons per acre. After treatment, the plots were planted with lima beans in 30 replications of each treatment. The roots and lower stems of the beans were examined at time of harvest with the following observations:

| Extender | Number Plants Examined | Percent of Plants Damaged by Worms |
| --- | --- | --- |
| Oil A | 3,820 | 0.0 |
| Oil B | 4,107 | 0.0 |
| Oil C | 3,901 | 0.0 |
| Propylene Chloride | 4,420 | 0.0 |
| Checks | 4,014 | 23.5 |

Example 11

2 gallons of ethylene bromide, 0.87 gallon of sorbitan-trioleate polyoxyalkylene derivative, and 26.12 gallons of Oil A, as described in Example 3, were mixed together to produce a water-dispersible composition. This product was introduced into and agitated with sufficient water to penetrate to a depth of approximately 2 feet over a soil plot 110 by 112 feet in area. The water was used in the irrigation of the indicated plot (calculated at approximately 3 acre inches of water). The actual application was accomplished by feeding the concentrate with efficient mixing into the effluent water from an irrigation standpipe during a conventional irrigation operation. The treated area and a check plot were planted 5 months later with lima beans. The roots and lower stems of 100 plants selected at random from each of the treated and control plots were examined 3 months after planting to determine the presence or absence of wireworm attack. 6 per cent of the plants from the treated area showed some injury. 56 per cent of the plants from the control plot were damaged.

Example 12

10 parts by weight of ethylene bromide is mixed with 90 parts of finely-divided sawdust to produce a fumigant dust composition. This product is disked into light sandy loam in amounts sufficient to supply between 2 and 4 gallons of ethylene bromide per acre. In an alternate procedure, the mixture is scattered in the furrow during plowing so as to be covered by the furrow slice. The treated areas are then planted. Significant reductions in both nematode and wireworm populations are so obtained and damage to the underground portions of plants is minimized.

Example 13

A 5 per cent by volume ethylene bromide solution in Oil A, as described in Example 3, was applied to sandy loam at the rate of 40 gallons per acre (2 gallons per acre of ethylene bromide) for the control of corn seed maggot (*Hylemyia cilicrura*). The application was made by introducing the treating mixture at a level 6 inches below the soil surface in drills 12 inches apart with a 7-shanked applicator as described in Example 5. Lima beans were planted in both the treated and check areas shortly after completion of the treatment. 35 days after planting, 300 plants were selected at random and examined for corn seed maggot damage. Only 1.0% of the plants in the treated area were found to have been attacked. In the plants from the check plots, 20.3% were found to have been severely damaged by the organism. The foregoing data represents the mean of 9 replications.

Example 14

A 10 per cent by volume solution of ethylene bromide in Oil A, as described in Example 3, was applied at the rate of 50 gallons per acre in 6-inch deep furrows for the control of white grubs. The furrows were covered and packed immediately after application of the fumigant. Later inspections of the treated soil and of citrus seedlings growing adjacent thereto indicated a commercial control of the grubs without significant injury to the seedlings.

We claim:

1. A method for protecting the underground parts of crops against attack by soil-inhabiting invertebrates which includes the steps of treating the soil with a liquid composition comprising ethylene bromide as a principal toxic ingredient, and at a dosage of at least 10 pounds of ethylene bromide per acre, and thereafter planting the treated soil.

2. A method for protecting the underground parts of crops against attack by soil-inhabiting invertebrates which includes the steps of distributing through the soil a solution of ethylene bromide in a liquid hydrocarbon boiling between 50° and 200° C., and thereafter planting the treated soil.

3. A method for protecting the underground parts of crops against attack by soil-inhabiting invertebrates which includes the steps of distributing ethylene bromide through the top soil at a dosage of at least 10 pounds per acre, and thereafter planting the treated soil.

4. A method for protecting the underground parts of crops against attack by soil-inhabiting invertebrates which includes the steps of distributing ethylene bromide through the top 6 inches of the soil at a dosage of from 10 to 120 pounds per acre, and thereafter planting the treated soil.

5. A method for protecting the underground parts of crops against attack by soil-inhabiting invertebrates which includes the step of treating the top soil prior to planting with ethylene bromide at a dosage of at least 10 pounds per acre and at a soil temperature of at least 55° F.

6. A method for protecting the underground parts of crops against attack by soil-inhabiting invertebrates which includes the step of treating the soil prior to planting by depositing ethylene bromide at from 2 to 7 inches below soil surface at a dosage of at least 10 pounds per acre, the ethylene bromide being so distributed that the maximum distance between deposits be not in excess of 18 inches.

7. A method for protecting the underground parts of crops against attack by soil-inhabiting invertebrates which includes the step of treating the soil prior to planting with a dispersion of ethylene bromide in a liquid carrier and at a dosage of at least 10 pounds of ethylene bromide per acre, the treatment being carried out by distributing the treating composition through the soil and at least 2 inches below the soil surface at soil temperature of at least 55° F., and thereafter compacting the soil over the top of the deposited treating composition.

8. A method for protecting the underground parts of crops against attack by soil-inhabiting invertebrates which includes the step of depositing ethylene bromide at from 2 to 7 inches below soil surface at a dosage of from 10 to 120 pounds per acre.

JOHN FRANKLIN KAGY.
ROBERT R. McPHERSON.

REFERENCES CITED

The following references are of record in the file of this patent:

UNITED STATES PATENTS

| Number | Name | Date |
|---|---|---|
| 2,391,890 | Fletcher | Jan. 1, 1946 |
| 2,425,238 | Fletcher | Aug. 5, 1947 |

OTHER REFERENCES

Lehman, "Laboratory Tests of Organic Fumigants for Wireworms," J. Econ. Entom., vol. 35, pp. 659–661, October 1942.